(12) United States Patent
Magno et al.

(10) Patent No.: US 10,630,060 B2
(45) Date of Patent: Apr. 21, 2020

(54) MOTORIZED DRIVE FOR RACKING OPERATION IN A MEDIUM VOLTAGE SWITCHGEAR

(71) Applicant: ABB Schweiz AG, Baden (CH)

(72) Inventors: Giorgio Magno, Brembate di Sopra (IT); Stefano Magoni, Osio Sotto (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/983,836

(22) Filed: May 18, 2018

(65) Prior Publication Data

US 2018/0375304 A1 Dec. 27, 2018

(30) Foreign Application Priority Data

May 18, 2017 (EP) ..................... 17171779

(51) Int. Cl.
- *H02B 11/127* (2006.01)
- *H02B 3/00* (2006.01)
- *F16H 25/20* (2006.01)
- *H02B 1/52* (2006.01)

(52) U.S. Cl.
CPC .......... *H02B 3/00* (2013.01); *F16H 25/2015* (2013.01); *H02B 11/127* (2013.01); *H02B 1/52* (2013.01)

(58) Field of Classification Search
CPC ... H02B 11/133; H02B 11/127; H02B 11/167; H02B 11/04; H02B 3/00; H02B 1/36; H02B 11/173; H02B 11/24; H02B 1/14; H02B 11/02; H02B 1/20; H02B 1/21; H02B 1/30; H02B 1/056; H01H 9/22; H01H 71/0264; H01H 71/128; H01H 9/0264; H01H 71/12; H01H 2223/044; H01H 33/42
USPC ....... 361/605, 609, 601, 608, 615, 607, 606, 361/614, 616, 624; 200/50.24, 501, 200/50.21, 50.26, 61.54, 50.23, 50.25
See application file for complete search history.

(56) References Cited

U.S. PATENT DOCUMENTS

| | | |
|---|---|---|
| 3,562,693 A | 2/1971 | Henning |
| 7,019,230 B1 | 3/2006 | Vaill et al. |
| 8,671,556 B1 | 3/2014 | Ledbetter |
| 2009/0014291 A1 | 1/2009 | Stevenson |
| 2015/0255965 A1* | 9/2015 | Boyce .................. H02B 11/127 361/605 |

OTHER PUBLICATIONS

European Patent Office, Extended Search Report issued in corresponding Application No. 17171779.6, dated Nov. 16, 2017, 7 pp.

* cited by examiner

*Primary Examiner* — Ahmed M Saeed
(74) *Attorney, Agent, or Firm* — Taft Stettinius & Hollister LLP; J. Bruce Schelkopf (57) ABSTRACT

A motorized drive for racking operations in a medium voltage switchgear comprising a main drive shaft actuated by a drive motor and adapted to be operatively coupled to a truck in said medium voltage switchgear characterized in that it comprises a replicating device which replicates the stroke of said truck during rack-in or rack out operations in said switchgear.

18 Claims, 7 Drawing Sheets

MOTORIZED DRIVE FOR RACKING OPERATION IN A MEDIUM VOLTAGE SWITCHGEAR

The present invention relates to a motorized drive for insertion and extraction operations (rack in/rack out operations) of a switching apparatus, such as a Medium Voltage circuit breaker or contactor, mounted on a truck in a Medium Voltage switchgear, which comprises a special device for replicating the stroke of said truck during rack-in or rack-out operations.

It is known that in Medium Voltage switchgear, which are equipped with a switching apparatus such as a medium voltage circuit breaker or contactor, it is normally foreseen the possibility to move said circuit breaker or contactor from a disconnected position to test position or from test position to a service position or from disconnected position to service position, and vice-versa. To this purpose, the circuit breaker or the contactor is normally mounted on a truck that allows the movement of the switching apparatus from an inserted position to an extracted position, passing through an intermediate position, if provided (test position) and vice-versa (rack-in/rack-out operations).

Such operations usually require a person that operates the system directly, by hand, on the front panel of the switchgear. Often, particularly in case of switching apparatuses of old type, there are not clear, visible and safe contact signals about the position of the switching apparatus (test, service), and this could lead to erroneous operations by the operator. Indeed, it may happen that, in case of failure, an internal arc flash could occur with emission of high temperature gases toward the outside of the switchgear. Such event could cause a serious injury or death of people who are operating close to the switchgear.

Thus, for safety reasons, it would be desirable that the rack-in/rack-out operations—as well as other operations—are carried out in remote to avoid any risk for the operator.

In order to increase safety for people who usually operate on Medium Voltage switchgear, on the market there are systems or kits that can perform racking operation (in or/and out)—as well as other kind of operations on the switchgear—by remote command.

However, the operation parameters for, e.g., the rack-in/rack-out operations are very specific, and usually varies depending on the kind and rating of the switching apparatus (circuit breaker or contactor) as well as on the kind of switchgear in which said switching apparatus is located. Consequently, these systems or kits are normally applicable only to a small range of combined couples switchgear/circuit breaker (or switchgear/contactor) and normally each couple has its dedicated kit. Moreover, small adaptations on the switchgear can be normally required, since, e.g., the layout of the front panel of the switchgear can be different from case to case.

In other words, since operating parameters and features—like, for example, travel distance of the circuit breaker or contactor truck, insertion stroke of the actuating shaft, layout of the front panel of the switchgear—a dedicated system is normally required for each relatively narrow range of combined couples switchgear/circuit breaker (or switchgear/contactor).

The working principle of the motorized drive of known type is based on the transformation of the rotary motion of the actuating shaft of the motorized drive into a linear motion of the truck supporting the switching apparatus inside the switchgear. Such transformation is normally carried out using an operating screw, which is rotated by the motorized drive and operatively connected to the truck so as linearly move it. The drive motor can therefore be programmed in order to make a number of turns corresponding to a predetermined stroke of the rack and then be switched-off. However, such system is not reliable and flexible, as it does not allow being used in different conditions (i.e. different operating strokes of the truck).

In certain systems of known type, the switching-off of the drive motor is carried out by monitoring one or more motor parameters (e.g., torque, current) so as identify indirectly the point at which the truck is stopped. However, these systems are somehow more complicated and expensive, and the switching-off of the drive motor is not based on the real position of the truck but on motor parameters that do not necessarily always correspond to the real situation. For instance, it may happen that the truck is stopped (e.g. due to an unforeseen obstacle or a failure in the mechanical system) before the operation is completed. The system monitoring the motor (e.g., torque, current) will consider it as a completion of the racking operation, thereby switching-off the drive motor before the operation is completed, with considerable risks of accident.

In view of the above, it is clear that one of the major disadvantages of existing motorized drives for insertion and extraction operations in a medium voltage switchgear is the lack of a reliable and flexible system that would allow adapting it to different insertion/extraction strokes, i.e. be usable on different kind of switching apparatuses with only minor adaptation required.

Hence, the present disclosure is aimed at providing a motorized drive for insertion and extraction operations (rack in/rack out operations) for switchgears, in particular a medium voltage switchgear, which allows overcoming at least some of the above-mentioned shortcomings.

In particular, the present invention is aimed at providing a motorized drive for insertion and extraction operations for switchgears, in particular a medium voltage switchgear, in which the interruption of the insertion/extraction operation is related to the actual position of the truck inside the switchgear.

Furthermore, the present invention is aimed at providing a motorized drive for insertion and extraction operations for switchgears, in particular a medium voltage switchgear, which can be used in many different switchgears.

In addition, the present invention is aimed at providing a motorized drive for insertion and extraction operations for switchgears, in particular a medium voltage switchgear, in which the stroke of the drive can be adjusted very easily according to the real stroke of the switchgear truck. Thus, the present invention relates to a motorized drive for racking operations in a medium voltage switchgear comprising a main drive shaft actuated by a drive motor and adapted to be operatively coupled to a truck in said medium voltage switchgear characterized in that it comprises a replicating device which replicates the stroke of said truck during rack-in or rack out operations in said switchgear.

As better explained in the following description, thanks to the particular structure of the motorized drive of the present invention the above-mentioned problems can be avoided, and the whole system is flexible, simple, and very easy to operate. The movement of the truck inside the switchgear takes place according to known principles (normally an operating screw rotated by the motorized drive and operatively connected to the truck to linearly move it) and will not be described in details. Indeed, the presence of the device which replicates the stroke of the truck allows governing the motorized drive operations in a very reliable and flexible manner. In practice, as better explained hereinafter, by directly connecting the replicating device with the main drive shaft of the motorized drive, it is possible to replicate with a desired ratio of displacement the stroke of trunk of the switchgear in the motorized drive. Then, it is possible to use appropriate switching means positioned on the replicating device to switch off the drive motor once the desired position (corresponding to the completion of the rack-in or rack-out operation) is reached.

To this purpose, the motorized drive for racking operations of the present invention preferably comprises a replicating device which is operatively coupled to said main drive shaft and comprises means for sending end-stroke signals to the drive motor, so as to interrupt its actuating action once the desired position is reached. In this way, the drive motor is switched-off only when the final desired position of the truck is reached, thereby avoiding the risk of premature interruption of racking operations that may occur when only the drive motor parameters are monitored Thus, in a preferred embodiment of the motorized drive for racking operations of the present invention, said replicating device comprises a movable actuator which is movable between a first position corresponding to a rack-in condition of said truck and a second position corresponding to a rack-out condition of said truck.

In order to increase the flexibility of use and the adaptability of the motorized drive of the present invention at different conditions and racking operations (i.e. at different kinds of switchgears with different racking strokes), said replicating device advantageously comprises first and second adjustable end-stroke means for setting respectively said first and second position.

In practice, in the motorized drive according to this embodiment, the positions of the first and second adjustable end-stroke means can be changed so as adapt the stroke of the movable actuator of the replicating device to the stroke of the truck in the switchgear, thereby making possible to use the motorized drive of the present invention on a broader range of switchgears with only minor adjustments (i.e. only by changing the position of the end-stroke means).

As better explained in the following description, in an exemplary embodiment of the motorized drive for racking operations of the present invention, said movable actuator comprises advantageously first actuating means acting on said first end-stroke means in correspondence of said first position and on said second end-stroke means in correspondence of said second position. In order to actuate the drive shaft, the motorized drive for racking operations of the present invention can conveniently comprise a drive gear which connects said drive shaft to said drive motor. Then, in order to actuate to movable actuator, the motorized drive of the present invention can conveniently comprise also a coupling gear which connects said movable actuator to said drive gear. By appropriately selecting the gear ratio between the drive gear and the coupling gear, it is possible to obtain a desired range of strokes of the movable actuator of the replicating device. According to a largely preferred embodiment of the motorized drive for racking operations of the present invention, the movable actuator conveniently comprises a main screw which is operatively connected to said drive gear and provided with a travelling nut. First actuating means are then connected to said travelling nut and act on said first end-stroke means in correspondence of said first position, and on said second end-stroke means in correspondence of said second position. In practice, according to this embodiment, for a given gear ratio (GR1) between the drive gear and the coupling gear, and for a given pitch of the main screw (PMS), the stroke of the movable actuator is given by the relation:

Stroke movable actuator=(N. of revolution of main drive shaft)×(GR1)×(PMS)

Similarly, for a given gear ratio between the drive main shaft and the truck operating screw (GR2), and for a given pitch of the truck operating screw (PTS), the stroke of the tuck inside the switchgear is given by the relation:

Stroke truck=(N. of revolution of main drive shaft)×(GR2)×(PTS)

Thus, it is clear from the above that—once the design parameters have been fixed—it is possible to determine the precise ratio between stroke of the truck and the stroke of the movable actuator and therefore set the positions of the first and second end-stroke means so that the travel In practice, the end-stroke means may conveniently consist of a pair of microswitches which are positioned at desired positions in the replicating device so as to match the rack-in (service position) and rack-out (disconnected position) final positions of the truck in the switchgear. During rack-in/rack-out operations, the movable actuator is moved between these two positions and when it reaches either of them (depending on the rack-in or rack-out operation) the first actuating means act on the relevant microswitch which send a signal (end-stroke signal) to switch off the drive motor.

It is therefore clear that in this way the prior art problem are solved, since the motorized drive of the present invention is highly reliable (direct connection between the truck movement and the system for stopping it) and highly flexible (positions of end-stroke means adjustable according to the needs). It is worth noting that—with the system of the present invention—fine adjustments of the position of the end-stroke means are always possible, thereby making possible to adapt the motorized drive to small operating changes that may happen during the operating life of the system. From a practical standpoint—according to an exemplary embodiment of the motorized drive for racking operations of the present invention—said replicating device may conveniently comprise a main frame which is provided with a first and a second sliding support. Said first and second sliding support are slidingly connected to said frame, and said first and second adjustable end-stroke means (e.g., microswitches) are respectively positioned on said first and second sliding support.

Preferably, the main frame of the replicating device may conveniently comprise guide means for guiding the movement of said first and second sliding support during their displacement.

Moreover, said main frame may conveniently comprise first and second setting means for setting respectively the position of said first and second sliding support in correspondence of the desired final position of the truck.

For instance, from a practical standpoint, said first and second setting means may each comprise a setting screw for moving said first and second sliding support to a desired position and a locking screw, e.g. an Allen screw, for locking said first and second sliding support in said desired position. According to a particular embodiment of the motorized drive for racking operations of the present invention, said replicating device comprises third adjustable end-stroke means for setting a third, test, position which is intermediate between said first (service/rack-in) position and said second (disconnected/rack-out) position.

As better explained in the following description, in such a case, the motorized drive for racking operations of the present invention advantageously comprises a movable actuator which comprises second actuating means acting on said third adjustable end-stroke means in correspondence of said third position. In practice, in the motorized drive according to this embodiment, the position of the third adjustable end-stroke means can be changed so as to simulate a test position of the truck, which is an intermediate position between said first (service/rack-in) position and said second (disconnected/rack-out) position.

From a practical standpoint—according to an exemplary embodiment of the motorized drive for racking operations of the present invention—said replicating device may conveniently comprise an auxiliary supporting frame which is provided with a third sliding support slidingly connected to said auxiliary supporting frame. Then, said third adjustable end-stroke means (e.g., microswitches) are conveniently positioned on said third sliding support and said auxiliary supporting frame may further comprise guide means for guiding the movement of said third sliding support and third setting means for setting the position of said third sliding support.

As an example, said third setting means may conveniently comprise a setting screw for moving said third sliding support to a desired position and locking means, e.g. a confirmation nut, for locking said third sliding support in said desired position.

Further features and advantages of the present invention will be more clear from the description of preferred but not exclusive embodiments of a motorized drive for racking operations for a switchgear, preferably a medium voltage switchgear housing, e.g., a contactor or a circuit breaker, according to the present invention, shown by way of examples in the accompanying drawings, wherein.

With reference to the attached figures—in its more general definition—the motorized drive 1 for racking operations of the present invention comprises a casing 4 that can be fixed on the front panel of a switchgear, using for instance a tool as described in the European Patent Application EP17164617 having title "SUPPORTING DEVICE FOR TOOLS FOR SWITCHGEARS AND TOOL KIT COMPRISING SAID DEVICE" whose description is incorporated herein by reference.

The casing 4 houses a drive motor 3 which actuates a main drive shaft 2 adapted to be operatively coupled to a truck in a medium voltage switchgear. The casing 4 is also provided with terminals 5 for power and/or communication connections. According to known principles, the truck is normally connected to an operating screw, which in turn can be connected to the main drive shaft 2 of the motorized drive 1. By rotating the main drive shaft 2 clockwise/counterclockwise, the truck is linearly moved in the insertion/extraction direction so as to carry out the rack-in/rack-out operations of the switching apparatus inside the switchgear.

One of distinguishing features of the motorized drive 1 of the present invention is given by the presence of a replicating device 10 which replicates the stroke of said truck during rack-in or rack out operations in said switchgear.

Figure 1:
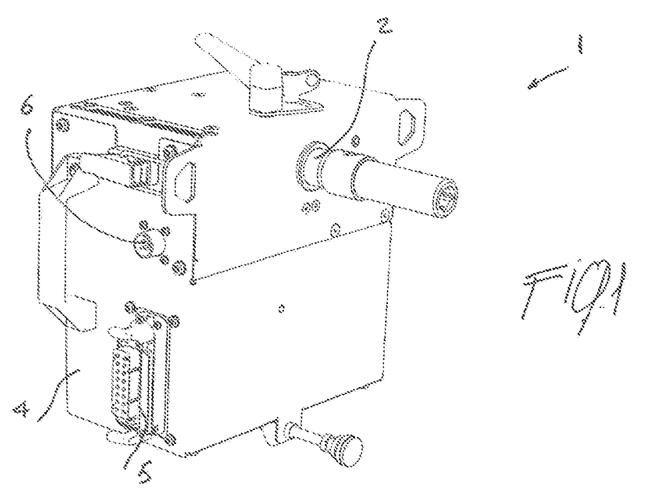
FIG. 1 is a perspective view of a motorized drive for insertion and extraction operations according to the invention.
Figure 2:
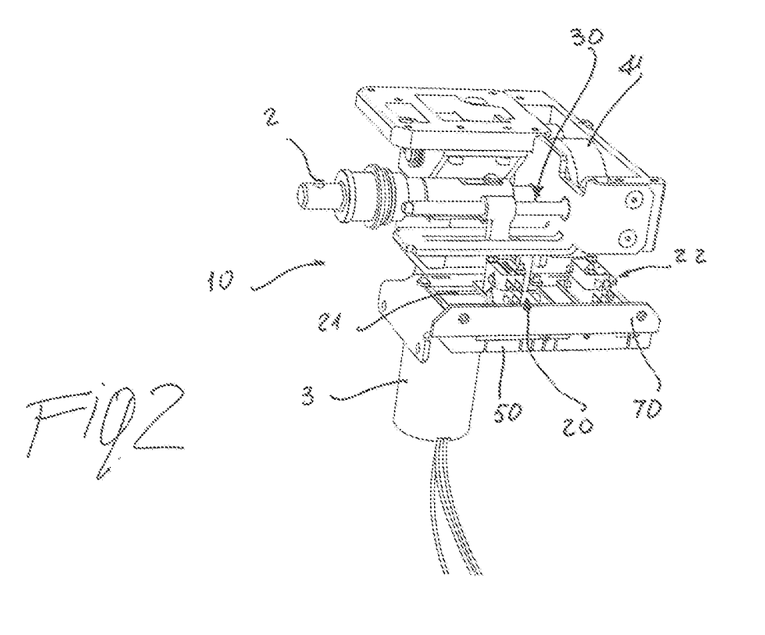
FIG. 2 is a perspective view of the main components of a motorized drive for insertion and extraction operations according to the invention.

With reference in particular to FIG. 2, the replicating 10 is operatively coupled to the main drive shaft 2 and comprises means 20 for sending end-stroke signals. Said means for sending end-stroke signals may conveniently consist of microswitches. In this way, it is possible to have a direct link with the rotation of the main drive shaft 2 and therefore—as better explained hereinafter—it is possible to replicate exactly the position of the truck inside the switchgear and send signals to the drive motor according to the needs.

In practice, thanks to the device 10 which replicates the stroke of the truck it is possible to switch-off the drive motor 3 once the desired position of the truck is reached, without having to use complicated system of monitoring, e.g., the torque of the drive motor 3 for stopping the actuating action (rack-in/rack-out operations).

Figure 3:
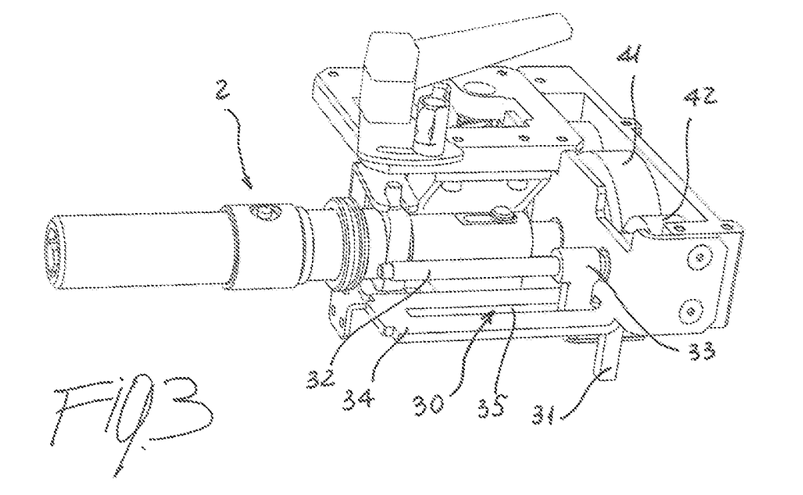
FIG. 3 is a perspective view of a first component part of a motorized drive for insertion and extraction operations according to the invention, in a first operating position.
Figure 4:
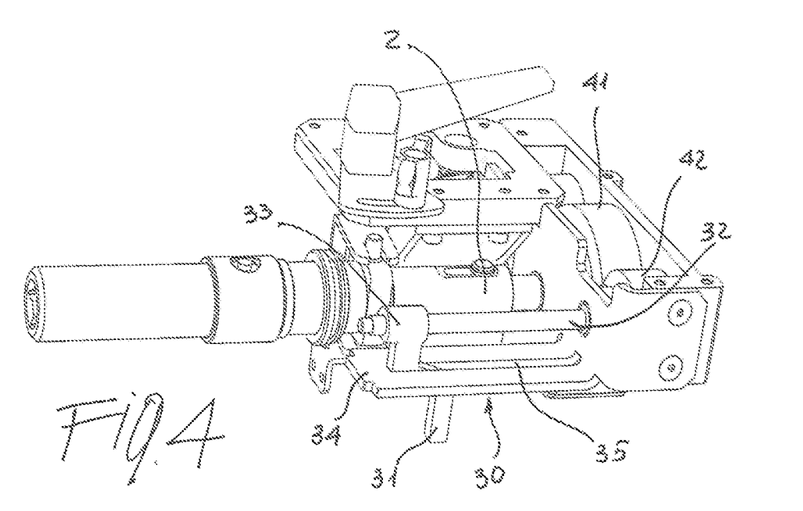
FIG. 4 is a perspective view of a first component part of a motorized drive for insertion and extraction operations according to the invention, in a second operating position.
Figure 5:
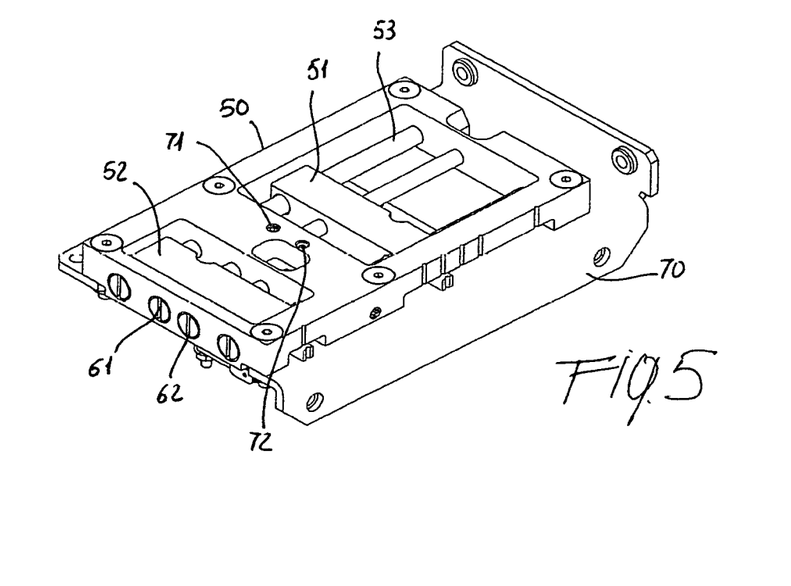
FIG. 5 is a first perspective view of a second component part of a motorized drive for insertion and extraction operations according to the invention.
Figure 6:
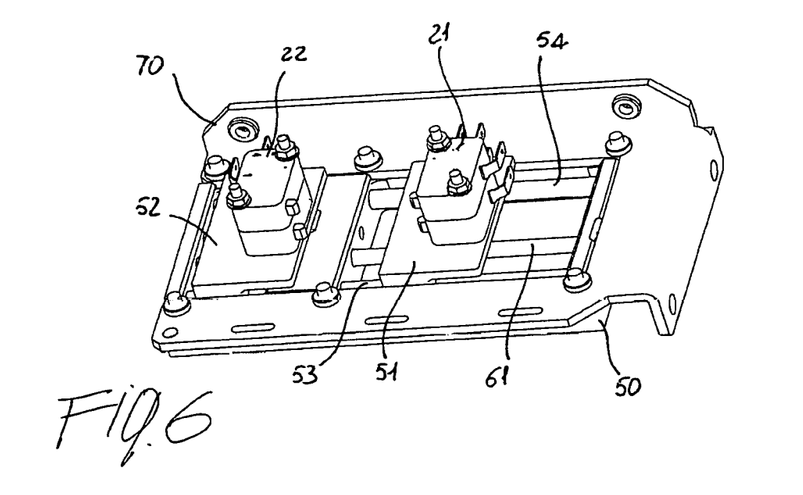
FIG. 6 is a second perspective view of a second component part of a motorized drive for insertion and extraction operations according to the invention.
Figure 7:
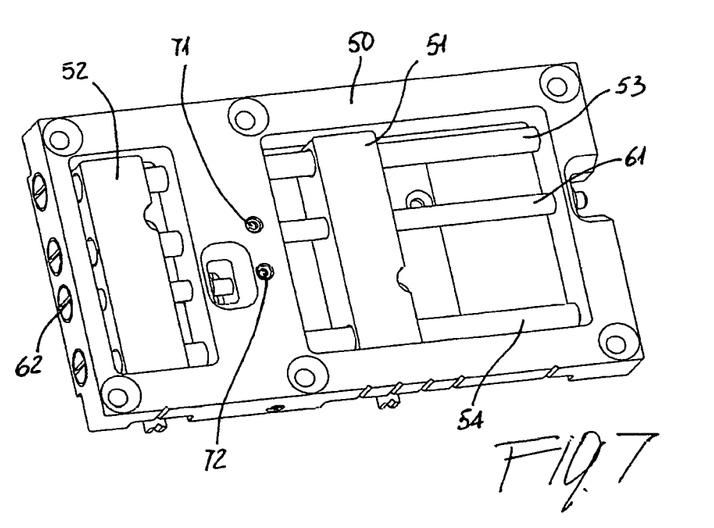
FIG. 7 is a first perspective view of a third component part of a motorized drive for insertion and extraction operations according to the invention.
Figure 8:
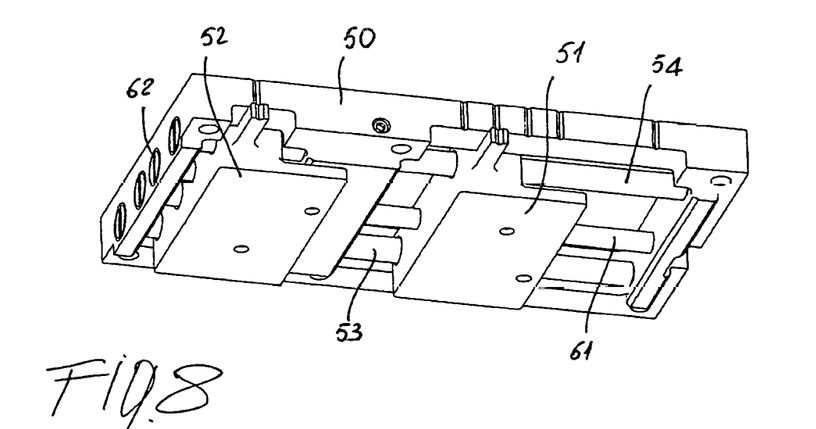
FIG. 8 is a second perspective view of a third component part of a motorized drive for insertion and extraction operations according to the invention.

With particular reference to FIGS. 3 and 4, in an embodiment of the present invention, the replicating device 10 advantageously comprises a movable actuator 30 which is movable between a first position corresponding to a rack-in condition of said truck and a second position corresponding to a rack-out condition of said truck.

The motorized drive 1 of the present invention normally comprises operating means for transmitting the motion from the drive motor 3 to the main drive shaft 2. Such operating means advantageously comprises a drive gear 41 connecting the main drive shaft 2 to said drive motor 3 with an appropriate ratio. Then, in order to actuate the movable actuator 30, the motorized drive 1 of the present invention advantageously comprises a coupling gear 42 which connects said movable actuator 30 to said drive gear 41.

In this way, the movable actuator 30 is directly connected to the main drive shaft 2 of the motorized drive 1 and therefore it is possible to have a direct relationship between the motion of the main drive shaft 2 (and consequently of the truck inside the switchgear) and the motion of the movable actuator 30. Consequently, the drive motor 3 is switched-off only when the final desired position of the truck inside the switchgear is reached.

In order to increase the flexibility of use and the adaptability of the motorized drive 1 of the present invention at different conditions and racking operations (i.e. at different kinds of switchgears with different racking strokes), the replicating device 10 advantageously comprise first 21 and second 22 adjustable end-stroke means which can be moved for setting respectively said first and second position mirroring the rack-in and rack-out end positions of the truck inside the switchgear.

By changing the positions of the first 21 and second 22 adjustable end-stroke means, the stroke of the movable actuator 30 of the replicating device 10 is adapted to the stroke of the truck in the switchgear, and therefore it is possible to use the motorized drive 1 on a broader range of switchgears with only minor adjustments.

Figure 9:
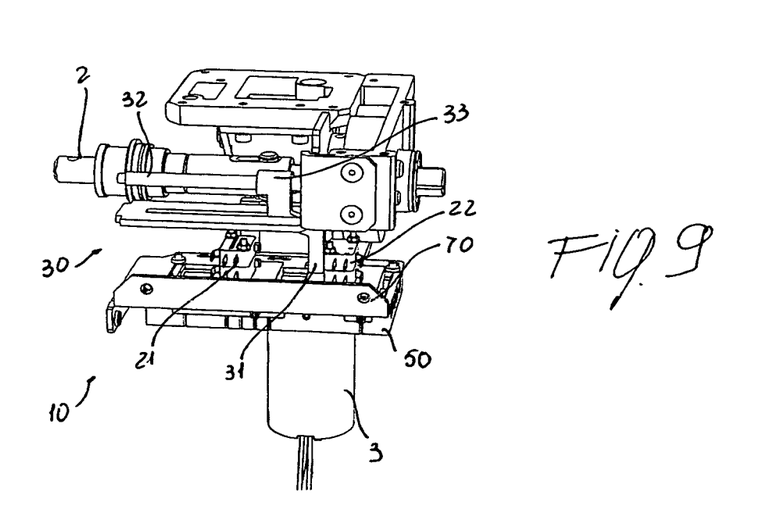
FIG. 9 is a perspective view of the main components of a motorized drive for insertion and extraction operations according to the invention, in a first operating position.
Figure 10:
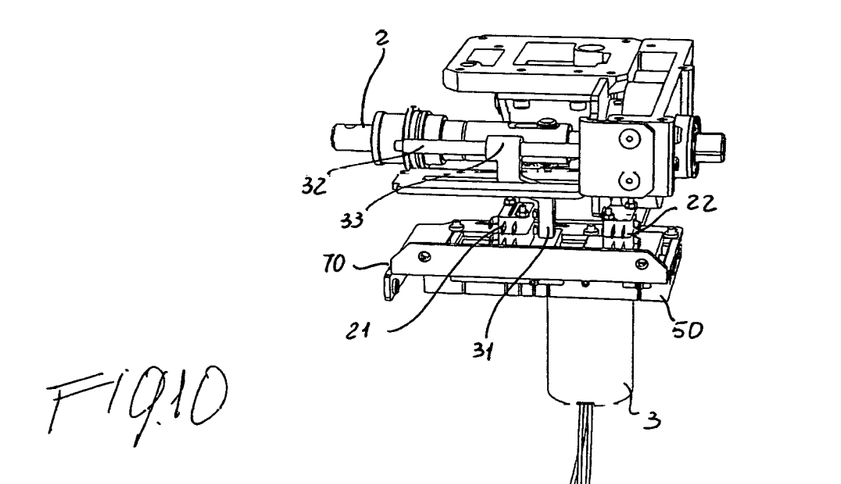
FIG. 10 is a perspective view of the main components of a motorized drive for insertion and extraction operations according to the invention, in a second operating position.

As shown in the attached figures, in particular FIGS. 9 and 10, the movable actuator 30 conveniently comprises first actuating means 31 which act on said first end-stroke means 21 in correspondence of said first position and on said second end-stroke means 22 in correspondence of said second position.

According to a largely preferred embodiment of the motorized drive 1 of the present invention, said movable actuator 30 advantageously comprises a main screw 32 which is operatively connected to said drive gear 41 and is provided with a travelling nut 33.

In practice, according to a preferred embodiment, the main screw 32 is rigidly connected to a coupling gear 42 which in turn is coupled to the main gear 41. Thus, depending on the gear ratio between the main gear 41 and the coupling gear 42, and depending on the pitch of the main screw 32, the stroke of the movable actuator 30 can be easily determined as previously described. Furthermore, the said movable actuator 30 in conveniently provided with first actuating means 31 which are connected to said travelling nut 33 and are moved linearly when the main screw 32 is rotated. With particular reference to FIGS. 3 and 4, the first actuating means 31 may conveniently consist of a tab rigidly fixed to the travelling nut 33. Movement of the tab 31 is conveniently guided by inserting it into a slot 35 of a fixed guiding plate 34.

Then, with particular reference to FIGS. 9 and 10, the tab 31 acts on said first end-stroke means 21 in correspondence of said first position and on said second end-stroke means 22 in correspondence of said second position (e.g. first and second microswitches in correspondence of said first and second position).

In practice, when the drive motor 3 is switched-on to carry out a rack-in/rack-out operation, motion is transmitted to the main drive shaft 2 by the drive gear 41. Rotation of the main drive shaft 2 brings about linear displacement of the truck inside the switchgear as previously explained. At the same time, motion is also transmitted to the movable actuator by the coupling gear 42. The displacement of the movable actuator 30 is proportional to the displacement of truck inside the switchgear according to a ratio that can be calculated using the equations for calculating the stroke of the truck and the stroke of the movable actuator previously described. Once the tab 31 reaches either the first 21 or second 22 microswitches, (depending on the kind of operation, rack-in or rack-out), the tab 31 acts on the relevant microswitch which sends an end-stroke signal to switch off the drive motor 3.

It is therefore possible, once the desired stroke of the truck is known, to set the positions of the adjustable end-stroke means 21 and 22 at the desired distance so that said positions correspond to the inserted (i.e., rack-in/service) and extracted (i.e., rack-out/disconnected) positions of the truck, and the displacement of the movable actuators 30 matches exactly the displacement of the truck into the switchgear (taking into account the proportional ratio between the two).

With particular reference to FIGS. 5-8, in an embodiment of the motorized drive 1 for racking operations of the present invention, said replicating device 10 comprises a main frame 50 which can be fixed to the casing 4 of the motorized drive 1 using a supporting frame 70.

The main frame 50 conveniently comprises a first 51 and a second 52 sliding support which are connected to said frame 50 and are free to slide inside it. The first 21 and second 22 adjustable end-stroke means, conveniently represented by microswitches, are respectively positioned on said first 51 and second 52 sliding support.

In the embodiment shown, the microswitches 21, 22 face each other and the first actuating means, represented by tab 31, are free to move in the space between them.

Conveniently, the movement of said first 51 and second 52 sliding support in the main frame 50 is guided by guide means 53, 54. In the example shown, the guide means consist of a pair of guiding rods which are fixed on the main frame 50. The first 51 and second 52 sliding support are provided with a pair of holes for insertion of said guiding rods 53, 54 and are free to slide with respect to them.

Furthermore, the main frame 50 advantageously comprises first and second setting means for setting respectively the position of said first 51 and second 52 sliding support. For example, the first and second setting means may each comprise a setting screw 61, 62 for moving said first 51 and second 52 sliding support to a desired position inside the frame 50. Moreover, the first and second setting means may also be provided with a locking screw 71, 72 for locking said first 51 and second 52 sliding support in said desired position.

Thus, with reference in particular to FIGS. 9 and 10, once the stroke of the truck inside the switchgear is known, the positions of the first 51 and second 52 sliding support can be set so that the stroke of the movable actuator 30 correspond to that of the truck, taking into account the proportional ratio described above, by simply acting on the setting screws 61 and 62.

Starting from the position of FIG. 9, that—for instance—corresponds to a rack-out position of the truck, when the truck is operated to carry out the rack-in operation, the tab 31 moves in the space between the microswitches 21 and 22 mirroring the movement of the truck in the switchgear. Once the tab 31 reaches the position of FIG. 10 (corresponding—for instance—to the rack-in position of the truck inside the switchgear), it enters into contact with the microswitch 21, thereby actuating it so that an end-stroke signal is sent to switch-off the drive motor 3.

Similarly, for the opposite operation, starting from the position of FIG. 10, that—for instance—corresponds to a rack-in position of the truck, when the truck is operated to carry out the rack-out operation, the tab 31 moves in the space between the microswitches 22 and 21 mirroring the movement of the truck in the switchgear. Once the tab 31 reaches the position of FIG. 9 (corresponding—for instance—to the rack-in position of the truck inside the switchgear), it enters into contact with the microswitch 22, thereby actuating it so that an end-stroke signal is sent to switch-off the drive motor 3.

With reference to FIGS. 11-14, in a particular embodiment of the motorized drive 1 for racking operations of the present invention, the replicating device 10 comprises third adjustable end-stroke means 81 for setting a third, test, position which is intermediate between said first (service/rack-in) position and said second (disconnected/rack-out) position.

Figure 11:
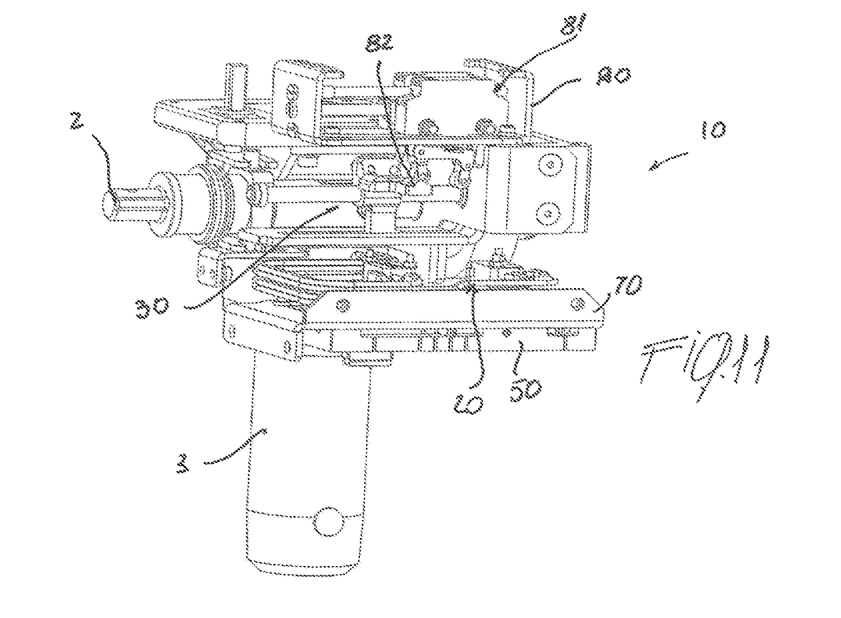
FIG. 11 is a perspective view of the main components of a particular embodiment of a motorized drive for insertion and extraction operations according to the invention.
Figure 12:
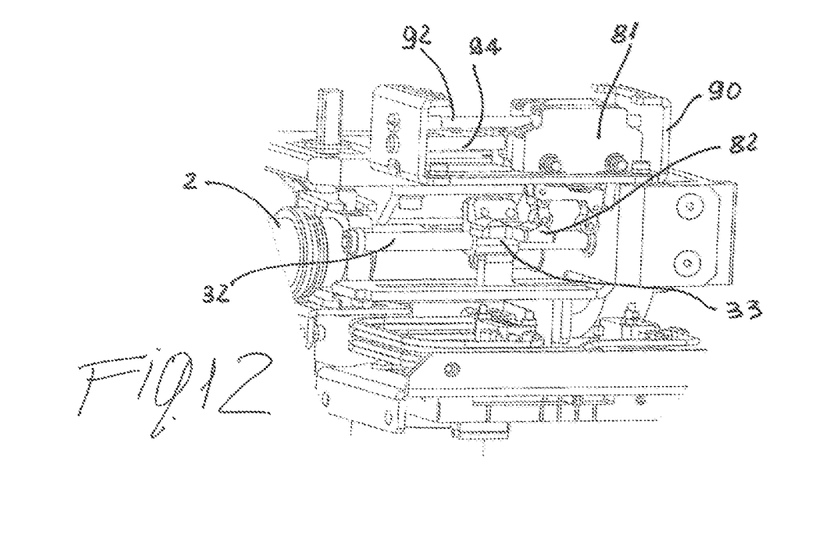
FIG. 12 is an enlarged view showing some details of the particular embodiment of a motorized drive for insertion and extraction operations of FIG. 11.

As shown in particular in FIGS. 11 and 12, in this embodiment of the motorized dire 1, the movable actuator 30 comprises second actuating means 82 which act on said third adjustable end-stroke means 81 in correspondence of said third position. As better explained hereinafter, the position of the third adjustable end-stroke means 81 can be changed so as to simulate a test position of the truck, which is an intermediate position between said first (service/rackin) position and said second (disconnected/rack-out) position.

Figure 13:
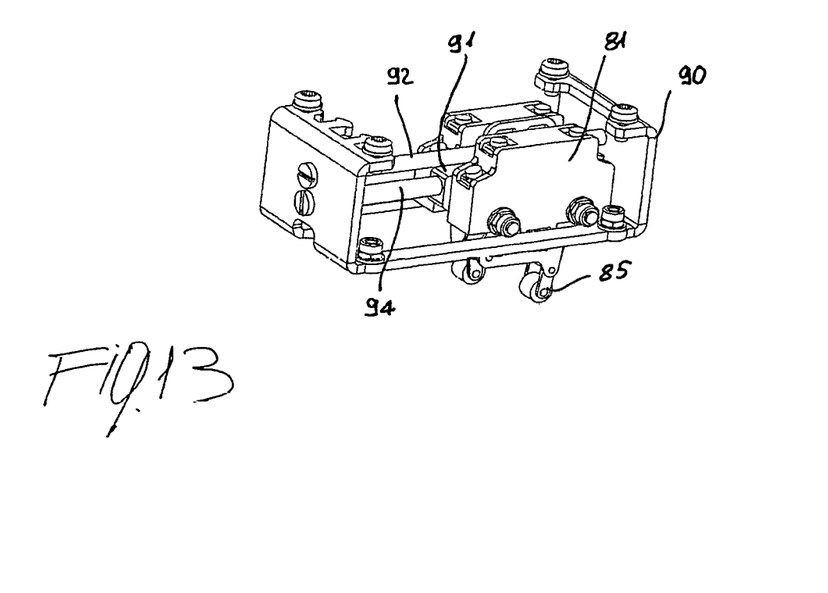
FIG. 13 is a first perspective view of a third component part of the particular embodiment of a motorized drive for insertion and extraction operations of FIG. 11.
Figure 14:
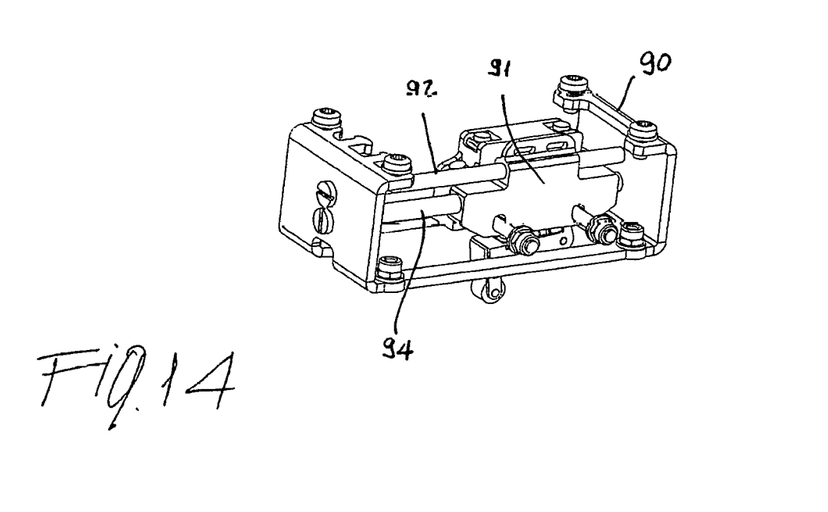
FIG. 14 is a second perspective view of a third component part of the particular embodiment of a motorized drive for insertion and extraction operations of FIG. 11.

From a practical standpoint—as shown in particular also in FIGS. 13 and 14—said replicating device 10 may conveniently comprise an auxiliary supporting frame 90 which can be enclosed in a casing a fixed, e.g. on the casing 4 of the motorized drive 1.

The supporting frame 90 is conveniently provided with a third sliding support 91 which is slidingly connected to said auxiliary supporting frame 90. Conveniently, the movement of said third sliding support 91 can be guided by guide means, e.g. a guiding rod 94, and its positioning is carried out by acting on setting means which in the example shown are constituted by a setting screw 92. In order to lock the third sliding support 91 at the desired position, the third setting means may conveniently comprise also locking means, e.g. a confirmation nut (not shown) preventing undesired rotation of the setting screw 92.

The third adjustable end-stroke means 81 (e.g., microswitches) are conveniently positioned on said third sliding support 91 so that they are actuated when the second actuating means (e.g. a tab 82 connected to the travelling nut 33) of the movable actuator 30 act on, e.g. an actuating roller of the microswitches 81, in correspondence of said third position. The microswitches 81 can therefore send to a control unit of the motorized drive 1 an end-stroke signal indicating that a test position of the truck inside the switchgear has been reached.

It is clear from the above description that the motorized drive for insertion and extraction operations (rack in/rack out operations) of a switching apparatus (e.g. a contactor or a circuit breaker) in a medium voltage switchgear according to the present disclosure, fully achieves the intended aims. Indeed, the presently disclosed motorized drive is fully adaptable to a broad range of switchgears, since the replicating device—which one of its distinguishing features—can replicate a broad range of truck strokes, e.g. from 200 mm to 450 mm.

Moreover, the possibility to regulate and fine adjust the stroke of the actuator very easily and quickly (e.g. by acting on a pair of setting screws), makes it very flexible and easy to use, and does not require any modification or upgrade of the switchgear or the switching apparatus to which it is applied.

Another important advantage is given by the fact that the replicating device is directly linked to the main shaft and is actuated by its rotation. Therefore, the switching-off of the motor drive is based on the real position of the truck inside the switchgear, and not on assumption (e.g. motor parameters) that may incorrect represent the real position of the truck.

Several variations can be made to the motorized drive thus conceived, all falling within the scope of the attached claims. In practice, the materials used and the contingent dimensions and shapes can be any, according to requirements and to the state of the art.

The invention claimed is:

1. A motorized drive for racking operations in a medium voltage switchgear comprising a main drive shaft actuated by a drive motor and adapted to be operatively coupled to a truck in said medium voltage switchgear wherein it comprises a replicating device which replicates the stroke of said truck during rack-in or rack out operations in said switchgear, wherein said replicating device comprises a movable actuator which is movable between a first position corresponding to a rack-in condition of said truck and a second position corresponding to a rack-out condition of said truck, wherein said replicating device is operatively coupled to said main drive shaft and comprises means for sending end-stroke signals.

2. A motorized drive for racking operations in a medium voltage switchgear comprising a main drive shaft actuated by a drive motor and adapted to be operatively coupled to a truck in said medium voltage switchgear wherein it comprises a replicating device which replicates the stroke of said truck during rack-in or rack out operations in said switchgear, wherein said replicating device comprises a movable actuator which is movable between a first position corresponding to a rack-in condition of said truck and a second position corresponding to a rack-out condition of said truck, and wherein said replicating device comprises first and second adjustable end-stroke means for setting respectively said first and second position.

3. The motorized drive for racking operations according to claim 2, wherein said replicating device is operatively coupled to said main drive shaft and comprises means for sending end-stroke signals.

4. The motorized drive for racking operations according to claim 2, wherein said movable actuator comprises first actuating means acting on said first end-stroke means in correspondence of said first position and on said second end-stroke means in correspondence of said second position.

5. The motorized drive for racking operations according to claim 2, wherein it comprises a drive gear connecting said drive shaft to said drive motor and a coupling gear connecting said movable actuator to said drive gear.

6. The motorized drive for racking operations according to claim 2, wherein said movable actuator comprises a main screw operatively connected to said drive gear and provided with a travelling nut.

7. The motorized drive for racking operations according to claim 6, wherein said movable actuator comprises first actuating means connected to said travelling nut and acting on said first end-stroke means in correspondence of said first position and on said second end-stroke means in correspondence of said second position.

8. The motorized drive for racking operations according to claim 2, wherein said replicating device comprises third adjustable end-stroke means for setting a third, test, position which is intermediate between said first and second position.

9. The motorized for racking operations according to claim 8, wherein said movable actuator comprises second actuating means acting on said third adjustable end-stroke means in correspondence of said third position.

10. The motorized drive for racking operations according to claim 9, wherein said replicating device comprises an auxiliary supporting frame comprising a third sliding support slidingly connected to said auxiliary supporting frame, said third adjustable end-stroke means being positioned on said third sliding support, said auxiliary supporting frame further comprising guide means for guiding the movement of said third sliding support and third setting means for setting the position of said third sliding support.

11. The motorized drive for racking operations according to claim 10, wherein said third setting means comprise a setting screw for moving said third sliding support to a desired position and locking means for locking said third sliding support in said desired position.

12. The motorized drive for racking operations according to claim 4, wherein it comprises a drive gear connecting said drive shaft to said drive motor and a coupling gear connecting said movable actuator to said drive gear.

13. The motorized drive for racking operations according to claim 4, wherein said movable actuator comprises a main screw operatively connected to said drive gear and provided with a travelling nut.

14. The motorized drive for racking operations according to claim 5, wherein said movable actuator comprises a main screw operatively connected to said drive gear and provided with a travelling nut.

15. A motorized drive for racking operations in a medium voltage switchgear comprising a main drive shaft actuated by a drive motor and adapted to be operatively coupled to a truck in said medium voltage switchgear wherein it comprises a replicating device which replicates the stroke of said truck during rack-in or rack out operations in said switchgear, wherein said replicating device comprises a movable actuator which is movable between a first position corresponding to a rack-in condition of said truck and a second position corresponding to a rack-out condition of said truck, and wherein said replicating device comprises a main frame comprising a first and a second sliding support slidingly connected to said frame, said first and second adjustable end-stroke means being respectively positioned on said first and second sliding support.

16. The motorized drive for racking operations according to claim 15, wherein said main frame comprises guide means for guiding the movement of said first and second sliding support.

17. The motorized drive for racking operations according to claim 15, wherein said main frame comprises first and second setting means for setting respectively the position of said first and second sliding support.

18. The motorized drive for racking operations according to claim 17, wherein said first and second setting means each comprise a setting screw for moving said first and second sliding support to a desired position and a locking screw for locking said first and second sliding support in said desired position.

* * * * *